ated Oct. 28, 1969

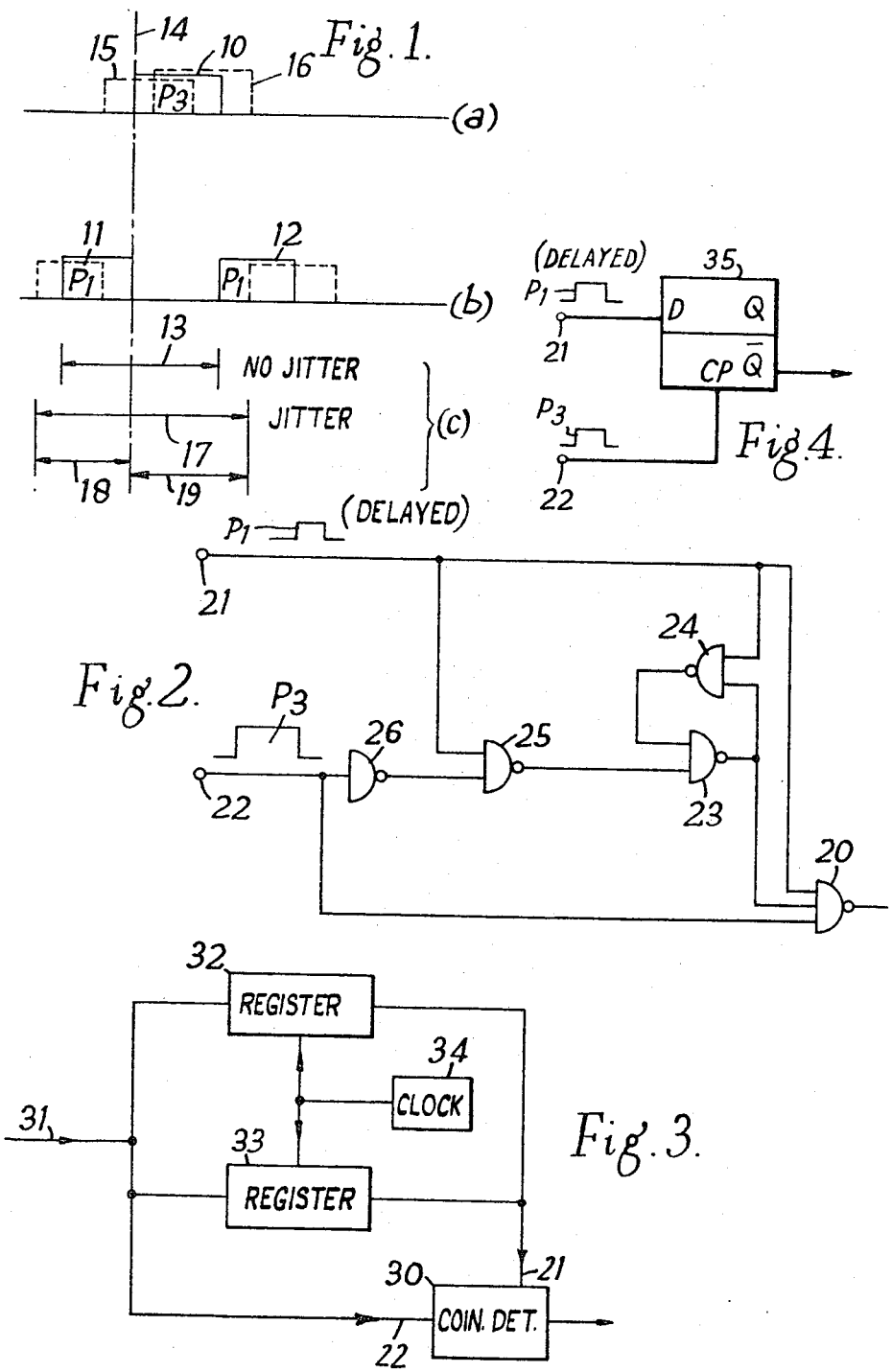

3,475,752
DECODER FOR INTERVAL ENCODED
PULSE PAIRS
David H. Mehrtens, Great Parndon, Essex, England, assignor to A. C. Cossor Limited, Harlow, England
Filed June 14, 1968, Ser. No. 737,011
Claims priority, application Great Britain, June 30, 1967, 30,379/67
Int. Cl. G01s 9/56
U.S. Cl. 343—6.8    5 Claims

ABSTRACT OF THE DISCLOSURE

In the decoder of a secondary radar transponder a first interrogating pulse is delayed and tested for coincidence with a second interrogating pulse. In order to tighten up the tolerances within which detection of coincidence occurs the decoder takes account of the order in which the pulses are applied to the coincidence detector; only one pulse order is accepted as giving coincidence.

---

The present invention relates to secondary radar decoders which provide an output signal only when two pulses are separated by a predetermined time. Such decoders are used in secondary radar systems, in which, when two pulses separated by a certain time are received by a transponder in an aircraft, the transponder transmits return information concerning the aircraft. Different intervals between pulses can be used to obtain different items of information from the aircraft.

In decoding secondary radar ground station interrogations the fundamental problem is to detect the reception of a pulse pair whose leading edges are separated by a time interval corresponding to a predetermined mode of interrogation, which for the internationally agreed civil modes A, B, C, D, are respectively 8, 17, 21 and 25 $\mu$s. If a pulse pair corresponding to the mode selected and spaced within $\pm 0.2$ $\mu$s. of the nominal interval, should be received, then the transponder is caused to reply. If the spacing is in error by more than $\pm 1$ $\mu$s. then transponder replies should not occur.

A decoder curently in use has two parallel shift registers. The two registers are clocked continuously at 1 mc./s. rates with a 0.5 $\mu$s. time delay between the two clock lines. Each register is constructed from dual D flip-flops with the Q output of each stage connected to the D input of the succeeding stage. Information is transmitted from stage to stage on the positive-going edge of the clock waveforms. The decoder receives the first pulse ($P_1$) of an encoded pair, and the second pulse ($P_3$) from the transponder to which it is connected. In the internationally-specified three-pulse system a non-mode-defining pulse $P_2$ for suppressing response to side-lobes of the interrogating aerial is always radiated 2 $\mu$s. after the pulse $P_1$ but although this pulse may cause difficulties by "capturing" decoders of the type which employ counters, it is not of importance in the present description and is only mentioned to clarify the designation of the pulse $P_3$. The pulses $P_1$ and $P_3$ are formed to have a nominal duration of 0.8 $\mu$s., and are fed to the D input of the first stages of both shift registers. Pulses may be propagated along either one or both shift registers depending on the relative timing of the 0.8 $\mu$s. pulses and the 1 $\mu$s. clock periods. Outputs are taken from the corresponding stages of both registers, after the appropriate delay, and are tested for coincidence with a pulse $P_3$.

The relative timing of the pulses $P_1$ and $P_3$ becomes distorted in the decoder, and can be regarded as an uncertainty in the timing of the leading edge of the pulse $P_3$, hereinafter referred as jitter. The principle cause of jitter is the fact that the pulses $P_1$ and $P_3$ are asynchronous with the clock pulses but the delayed pulses $P_1$ are necessary phase referenced to the clock pulses and can only occur at positions spaced by 0.5 $\mu$s. intervals. Pulling the $P_1$ pulses into line with the clock pulses has the apparent effect of shifting the $P_3$ pulses relative to the delayed $P_1$ pulses by up to 0.5 $\mu$s. Decoding occurs not only when the leading edge of a delayed pulse $P_1$ and that of a pulse $P_3$ are exactly coincident, but also when their durations overlap. Thus not only are pulses spaced by the nominal time decoded but also those spaced by longer and shorter periods are decoded. The specification for decoders therefore has to be in the form that pulses whose leading edges are spaced by intervals in a certain range are certainly decoded, pulses whose leading edges are spaced by intervals in extensions at both ends of the range may be decoded, but pulses spaced by greater intervals must certainly not be decoded. Jitter extends, by the maximum extent of the jitter, the range of intervals over which decoding occurs, and can make this range too large for proper decoding. The object of this invention is to overcome the problem which thus exists.

According to the present invention there is provided a secondary radar pulse decoder for indicating when first and second interrogating pulses are separated by a predetermined time, comprising means for delaying the first pulse by the predetermined time and coincidence means responsive both to the concurrence of the delayed first pulse and the second pulse and to the order in which such pulses are applied to provide an output for triggering a transponder return only when the delayed first pulse and the second pulse are concurrent and a predetermined one of the delayed first pulse and the second pulse commences not later than the other one of these pulses.

By allowing decoding only when the pulse $P_3$ (i.e. the pulse referred to immediately above as the second pulse) occurs after the delayed pulse $P_1$, for example, the extension of the decoding range is reduced since only when $P_3$ at 10 (in full lines) in its correct timing position, and advanced, will decoding occur.

Two embodiments of the invention will now be described, by way of example, with reference to the accompanying drawings, in which:

FIG. 1 is a series of pulse diagrams showing how jitter affects decoding,

FIG. 2 is a block diagram of a coincidence detector,

FIG. 3 is a block diagram of a decoder according to the invention, and

FIG. 4 illustrates another coincidence detector.

Referring to FIG. 1, the problem caused by jitter will first be explained, in more detail. FIG. 1(a) shows a pulse $P_3$ at 10 (in full lines) in its correct timing position, and FIG. 1(b) shows two delayed pulses $P_1$ at the extreme positions 11 and 12 which will allow decoding, since there is overlap with the pulse $P_3$. FIG. 1(c) shows at 13 the range of leading edge positions of pulses $P_1$ which will allow decoding. The line 14 in FIG. 1(c) shows the position of the leading edge of the delayed pulse $P_1$ if its leading edge is coincident with that of $P_3$.

When jitter occurs the pulse $P_3$ may occur anywhere between positions 15 and 16, and consequently decoding can occur with the pulses $P_1$ at 11 and 12 shifted further to the positions shown in broken lines and decoding is extended to the range 17 in FIG. 1(c). Thus pulses outside the desired spacing may be decoded.

If decoding is allowed only when the pulse $P_3$ occurs after the pulse $P_1$, the range of decoding is reduced to that designated 18 in FIG. 1(c) which just includes the case where the leading edges of the pulses $P_1$ and $P_3$ are coincident.

A logic circuit which detects coincident pulses but gives an output only when one pulse is applied after the other will now be described with reference to FIG. 2.

A NAND gate 20 has three input terminals, one connected to a terminal 21 to which the delayed pulses $P_1$, extended in secondary radar applications to a duration of the order of 1.3 $\mu$secs., are applied, another input terminal connected to a terminal 22 to which the pulses $P_3$ are applied, and the third input terminal connected to a NAND gate 23. Hence the gate 20 can only open in the presence of both the pulses $P_1$ and $P_3$. A NAND gate 24 is coupled to receive input signals from the gate 23 and the terminal 21, while the gate 23 receives an input signal from the gate 24 and a NAND gate 25. The pulse $P_3$ is passed through a NAND gate 26 which is used as an inverter, and with the pulse $P_1$ is applied to the gate 25.

In the following description of the operation of the circuit of FIG. 2, signals which enable the NAND gates 20 to 26 are designated "1" and the absence of such signals is designated "0." The output of a gate is "0" only when all inputs are "1."

When neither pulses $P_1$ nor $P_3$ is present, the gate 24 receives a "0" and applies a "1" to the gate 23. The gate 25 receives a "1" via the inverter 26 and a "0" from the terminal 21; thus a "1" is applied to the gate 23 whose output is therefore a "0." The gates 23 and 24 are then set to inhibit the gate 20. The gates 23 and 24 constitute a bistable circuit and in the state in which the gate 23 provides "0" (and the gate 24 provides "1") the gate 20 is inhibited. In the second state in which the gates 23 and 24 provide "1" and "0" respectively, the gate 20 is not inhibited. The bistable circuit can only be set to this second state when the gate 25 provides a "1," which requires the simultaneous presence of $P_1$ delayed and the absence of $P_3$.

Considering the case when $P_3$ occurs before $P_1$, the pulse $P_3$ is applied to the terminal 22, a "0" is applied to the gate 25 which is still not enabled and the gates 23 and 24 are unaffected. The arrival of a pulse $P_1$ does not enable the gate 25 which still receives a "0" and a "1." The pulse $P_1$ is also applied to the gate 24 but this also receives a "0" from the gate 23 and is not opened, and the gate 20 is not enabled. On the removal of the pulse $P_1$ and $P_3$ the gates return to their original conditions.

If a pulse $P_1$ is applied before a pulse $P_3$, the gate 25 is enabled, which closes the gate 23, applying a "1" to the gate 20. The gate 24 is also opened and it applies a "0" to the gate 23 changing the state of the gates 23 and 24. The application of a pulse $P_3$ now opens the gate 20, closes the gate 25 and applies a "1" to the gate 23 which remains closed. On removal of the pulses the gates return to original states and the circuit is reset.

Hence the gate 20 is opened only when a pulse $P_3$ is applied after a pulse $P_1$, and these pulses are concurrent. The output from the gate 20 is terminated when either pulse $P_1$ or $P_3$ is removed.

While, for convenience of explanation, a direct connection from the terminal 21 to the gate 20 has been shown, this correction is in fact redundant. The gate 20 merely requires two inputs connected to the gate 23 and the terminal 22 respectively.

FIG. 3 shows the circuit of a decoder in which the coincidence circuit of FIG. 2 is designated as a block 30. Pulses to be decoded are applied at a terminal 31, and are passed to two shift registers 32 and 33 which are supplied with out-of-phase clock pulses from a clock source 34. After a specified delay depending on the number of stages in the registers, delayed pulses appear at the outputs of the registers and are passed to the input 21 of the coincidence detector 30 where they may or may not be concurrent with undelayed pulses applied direct from the input terminal 31 to the input 22. In a practical circuit the registers 32 and 33 would be tapped at points corresponding to the delays of the civil secondary radar modes A, B, C, and D, mentioned above, and separate coincidence circuits would be provided for each tapping point.

Thus it will be seen from FIG. 1 and the corresponding explanation of jitter, that the provision of the coincidence detector 30, reduces decoding errors.

Two registers have been shown in FIG. 3 since it is well known to use two registers for reasons already mentioned. The coincidence detector can equally be used in a decoder employing one delay line only.

While the circuit of FIG. 2 has been used to indicate coincidence of $P_1$ and $P_3$ only when $P_1$ commences not after $P_3$, thus restricting decoding to the range 17 of FIG. 1(c), the connections to the terminals 21 and 22 in FIG. 3 could be interchanged so that coincidence is only indicated when $P_1$ and $P_3$ overlap and $P_1$ commences not before $P_3$. This would restrict decoding to the range indicated at 19 in FIG. 1(c).

The second embodiment of the invention utilizes the coincidence detector shown in FIG. 4 as the block 30 in FIG. 3, in place of the detector of FIG. 2. The coincidence detector in FIG. 4 comprises an edge-triggered bistable circuit 35, in the embodiment illustrated a D flip-flop. The terminal 21 for the delayed $P_1$ pulse is connected to the D input and the terminal 22 for $P_3$ is connected to the clock input CP. The flip-flop will only switch if $P_1$ delayed commences not after $P_3$ and hence the $\overline{Q}$ output of the flip-flop will be exactly the same as the output of the gate 20 in FIG. 2. In either event this output is used to trigger the transponder return. The transponder circuits other than the decoder are of course not shown; they can be entirely conventional.

I claim:

1. In a secondary radar pulse decoder for indicating when first and second interrogating pulses are separated by a predetermined time, and comprising means for delaying the first pulse by the predetermined time and coincidence means responsive to the concurrence of the delayed first pulse and the second pulse, the improvement consisting in that the coincidence means is additionally responsive to the order in which the pulses are applied thereto to provide an output for triggering a transponder return only when the delayed first pulse and the second pulse are concurrent and a predetermined one of the delayed first pulse and the second pulse commences not later than the other one of these pulses.

2. A secondary radar pulse decoder according to claim 1, wherein the coincidence means comprise first means for indicating when the delayed first pulse and the second pulse are concurrent and second means for inhibiting the first means unless a predetermined one of the delayed first pulse and the second pulse commences not later than the other one of these pulses.

3. A secondary radar pulse decoder according to claim 2, wherein the said second means comprise a bistable circuit having first and second states, in the first of which the said first means is inhibited, an an input circuit to the bistable circuit for setting the bistable circuit to the second state in response to the simultaneous presence of the said predetermined one of the pulses and the absence of the said other one of the pulses.

4. A secondary radar pulse decoder according to claim 1, wherein the coincidence means is an edge-triggered bistable having a control input responsive to the said predetermined one of the pulses and a clock input responsive to the said other one of the pulses.

5. A secondary radar pulse decoder according to claim 1, wherein the means for delaying the first pulse comprises at least one shift register responsive to clock pulses.

References Cited
UNITED STATES PATENTS

| | | | |
|---|---|---|---|
| 3,007,156 | 10/1961 | Barber | 343—6.8 |
| 3,155,966 | 11/1964 | Allen | 343—6.8 |
| 3,178,706 | 4/1965 | Clock | 343—6.8 |
| 3,412,381 | 11/1968 | Hirsch et al. | 343—6.8 X |

RODNEY D. BENNETT, Jr. Primary Examiner

M. F. HUBLER, Assistant Examiner